Dec. 14, 1943.                G. A. SEELEY                2,336,573
                        ASSEMBLING APPARATUS
              Filed Dec. 4, 1941            5 Sheets-Sheet 1
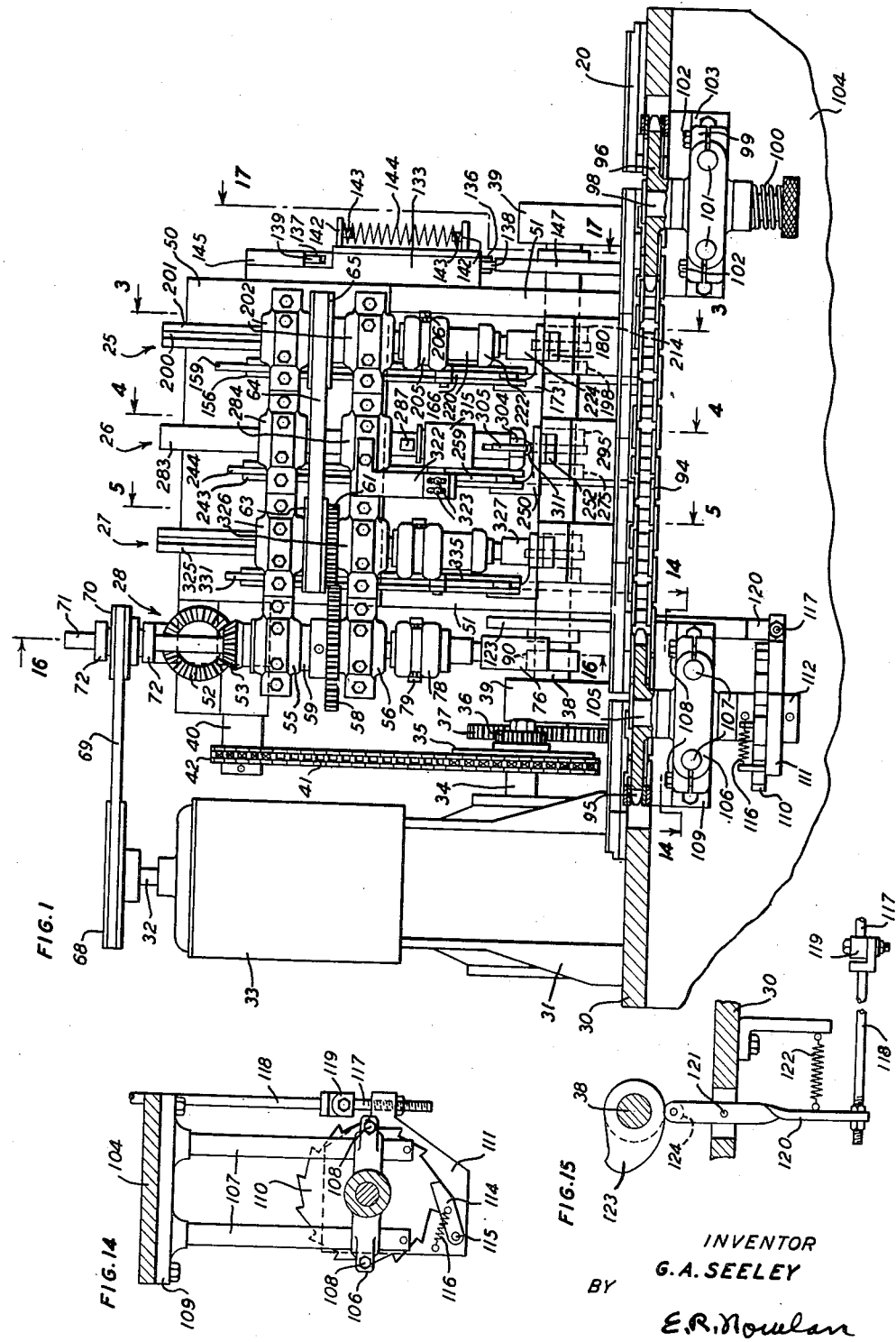
INVENTOR
G. A. SEELEY
BY
E. R. Nowlan
ATTORNEY Dec. 14, 1943.                    G. A. SEELEY                    2,336,573
                              ASSEMBLING APPARATUS
                              Filed Dec. 4, 1941            5 Sheets-Sheet 2
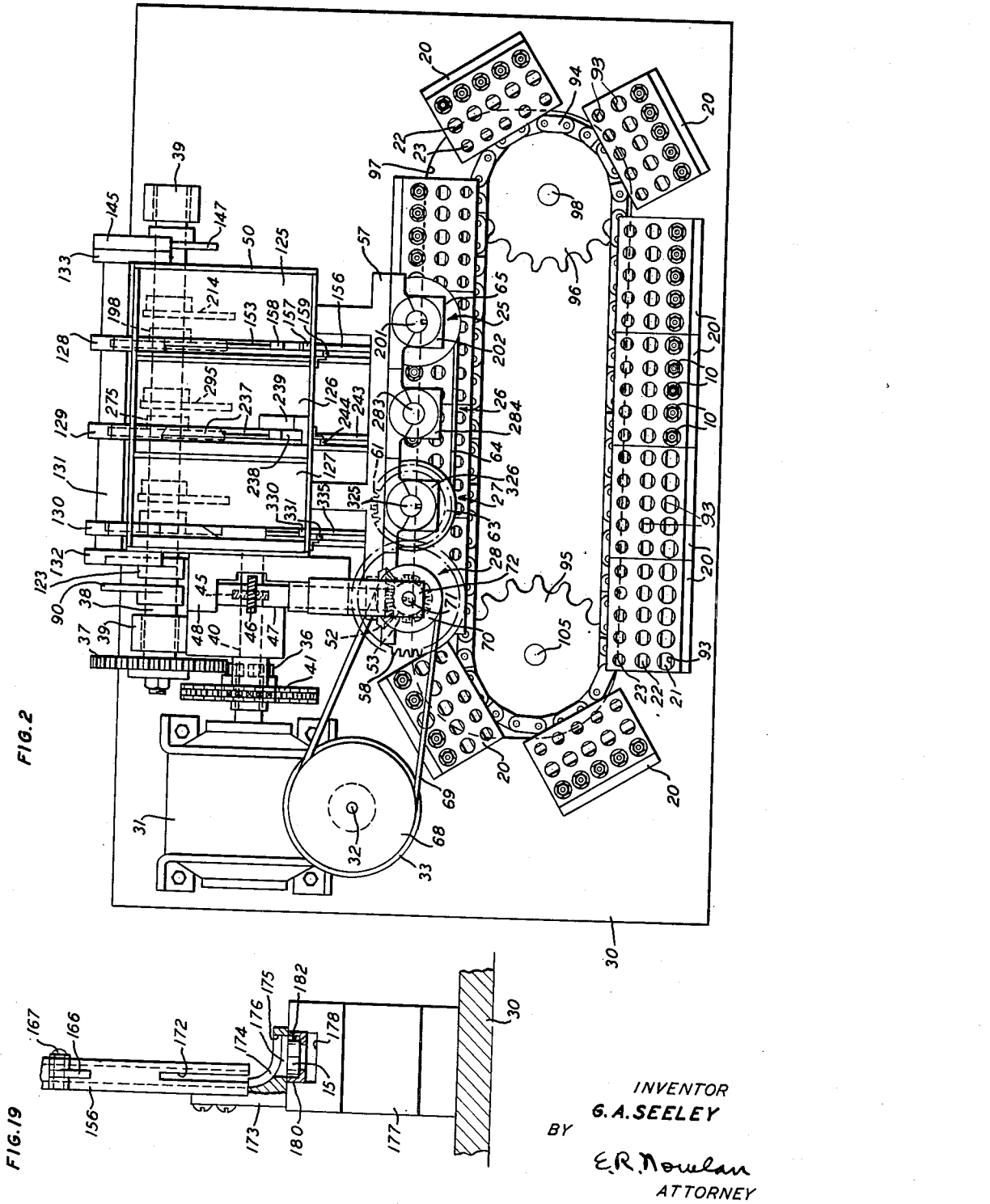
INVENTOR
G. A. SEELEY
BY
E. R. Nowlan
ATTORNEY

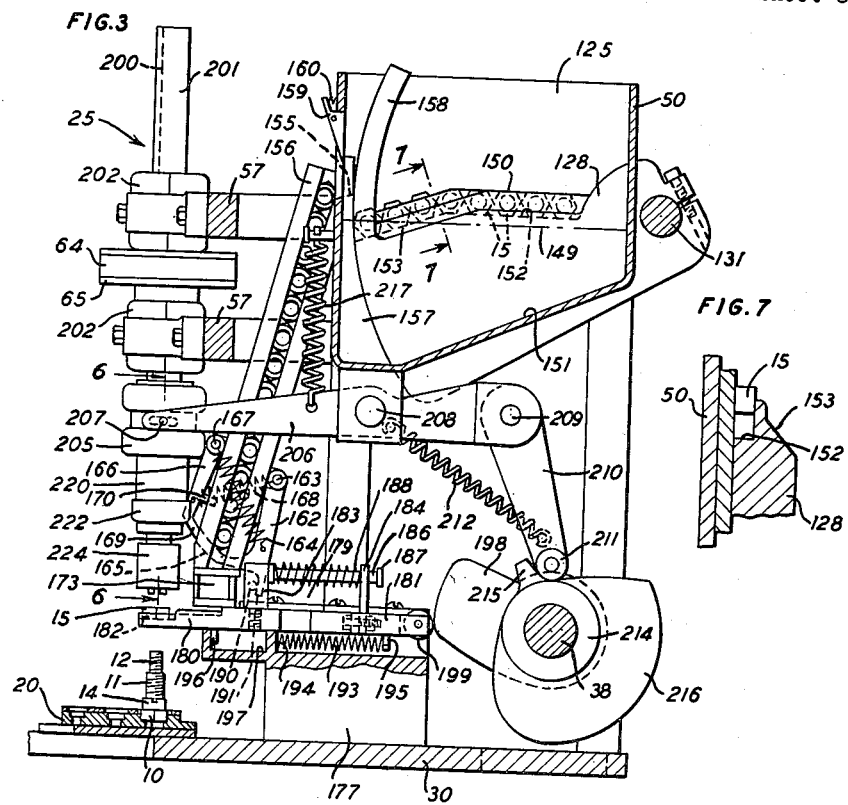

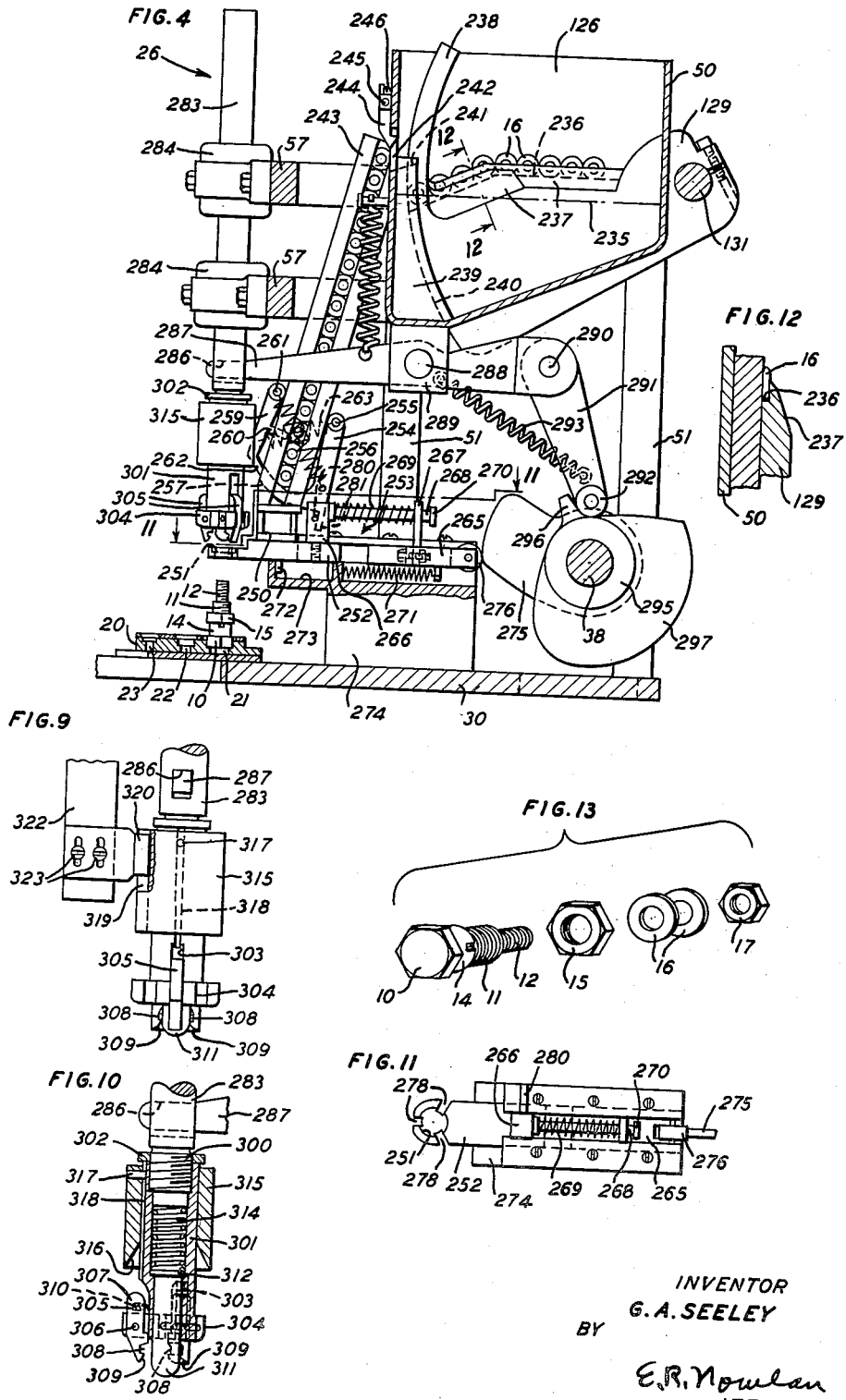

Dec. 14, 1943.    G. A. SEELEY    2,336,573
ASSEMBLING APPARATUS
Filed Dec. 4, 1941    5 Sheets-Sheet 5
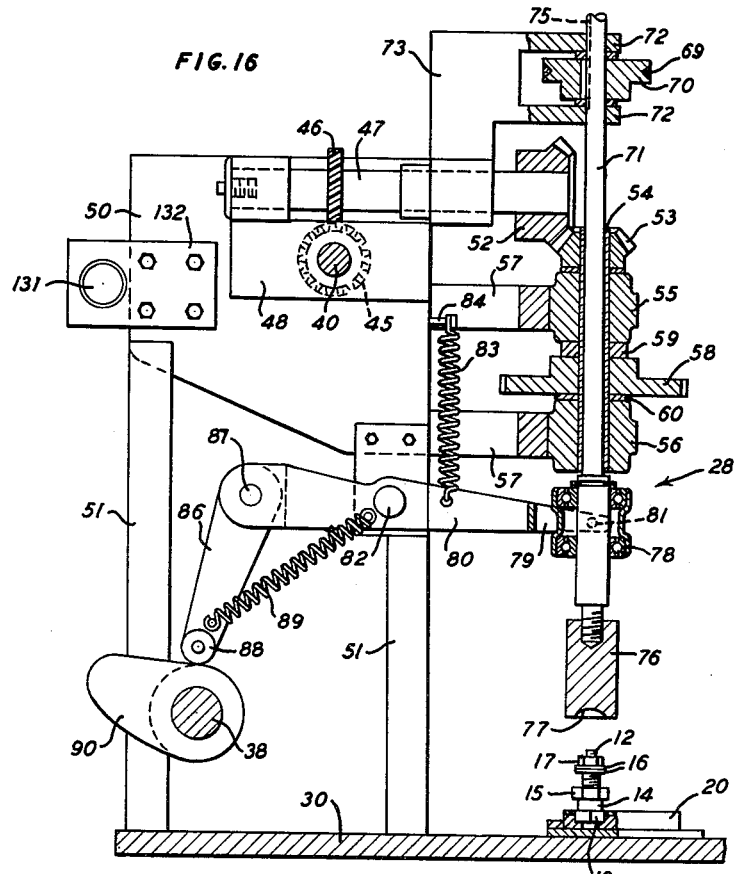
INVENTOR
G. A. SEELEY
BY
E. R. Nowlan
ATTORNEY Patented Dec. 14, 1943

2,336,573

UNITED STATES PATENT OFFICE 2,336,573

ASSEMBLING APPARATUS

George A. Seeley, Baltimore, Md., assignor to Western Electric Company, Incorporated, New York, N. Y., a corporation of New York Application December 4, 1941, Serial No. 421,623

26 Claims. (Cl. 10—155)

This invention relates to assembling apparatus, and more particularly to apparatus for assembling a plurality of parts, such as nuts and washers, on articles, such as bolts.

An object of the invention is to provide an assembling apparatus which is simple in structure yet highly efficient in assembling a plurality of different parts in successive order on an article.

With this and other objects in view, the invention comprises an assembling apparatus having a plurality of assembling units supplied at the time intervals with different parts and actuated in synchronism with mechanism for intermittently moving articles to assemble the parts in successive order on the articles, another unit being adapted to form the articles to eliminate displacement of the parts thereon.

Other objects and advantages will be apparent from the following detailed description when taken in conjunction with the accompanying drawings, wherein Fig. 1 is a front elevational view of the apparatus;

Fig. 2 is a top plan view of the apparatus;

Fig. 3 is an enlarged vertical sectional view taken along the line 3—3 of Fig. 1;

Fig. 4 is an enlarged vertical sectional view taken along the line 4—4 of Fig. 1;

Fig. 5 is a vertical sectional view taken substantially along the line 5—5 of Fig. 1;

Fig. 6 is an enlarged fragmentary sectional view taken along the line 6—6 of Fig. 3;

Fig. 7 is an enlarged fragmentary sectional view taken along the line 7—7 of Fig. 3;

Fig. 8 is an enlarged fragmentary sectional view taken along the line 8—8 of Fig. 5;

Fig. 9 is an enlarged fragmentary detailed view of a portion of the washer assembling unit shown in Fig. 4;

Fig. 10 is a vertical sectional view of the structure shown in Fig. 9;

Fig. 11 is a top plan view of a washer feeding element taken substantially along the line 11—11 of Fig. 4;

Fig. 12 is an enlarged fragmentary sectional view taken along the line 12—12 of Fig. 4;

Fig. 13 is an exploded view of an article and a plurality of parts to be assembled thereon;

Fig. 14 is a fragmentary sectional view taken along the line 14—14 of Fig. 1;

Fig. 15 is a fragmentary detailed view of mechanism associated with the structure shown in Fig. 14;

Fig. 16 is an enlarged vertical sectional view taken along the line 16—16 of Fig. 1;

Fig. 17 is a vertical sectional view taken substantially along the line 17—17 of Fig. 1;

Fig. 18 is a fragmentary side elevational view of a portion of the structure shown in Fig. 17, and Fig. 19 is an enlarged fragmentary detailed view of the structure at the juncture of one of the feeding chutes and feeding elements.

Parts to be assembled

Attention is first directed to Fig. 13, which illustrates an article, namely a bolt 10, having a threaded portion 11 which is internally threaded to receive a stud 12. The article includes the conventional head structure with threaded portions of different diameters, a washer 14 being disposed upon the threaded portion 11 to rest upon the head of the bolt. A large nut 15 is to be assembled on the threaded portion 11, after which two washers 16, having inner diameters of sufficient size to receive the stud 12 in the threaded portion 11, are then to be assembled on the stud and held in place by a smaller nut 17 subsequently assembled on the stud 12. Finally, the end of the stud is to be formed by a spinning operation, to hold all of the parts, namely the washer 14, the large nut 15, the washers 16 and the small nut 17, on the article 10.

General description of apparatus

Attention is now directed to Figs. 1 and 2, which illustrate trays 20 formed with rows of recesses 21, 22 and 23 of different sizes to receive different types of articles, the trays being moved intermittently to impart similar movement to the articles 10 into alignment with units 25, 26, 27 and 28 respectively. When an article 10 is in alignment with the unit 25, the large nut 15 is assembled thereon, this article subsequently receiving two washers 16 from the unit 26 and the small nut from the unit 27, while at the unit 28, the end of the article is formed to retain the parts, namely the nuts and washers, thereon.

General driving mechanism

Considering the structure more specifically, the apparatus in general is provided with a table 30 upon which is mounted a speed reducing mechanism 31, driven by one end (not shown) of a motor shaft 32 of a motor 33. A shaft 34, constituting the output end of the speed reducing mechanism 31, has a sprocket 35 and a pinion 36 mounted thereon. The pinion 36 interengages a gear 37 which is mounted upon a cam shaft 38, the latter being rotatably supported in bearings 39 and supporting for rotation therewith a plurality of cams which will hereinafter be described. The sprocket 35 is operatively connected to a shaft 40, through a chain 41 and a sprocket 42, the latter being mounted upon the shaft 40.

Attention is now directed to Figs. 1, 2 and 16. The shaft 40 has a spiral gear 45 mounted thereon which interengages a spiral gear 46 of a shaft 47. The shafts 40 and 47 are journalled in suitable bearings of a bearing bracket 48, the latter being mounted upon one end of a hopper housing 50. The hopper housing, including compartments for the parts 15, 16 and 17, is supported by suitable uprights 51 mounted upon the table 30. The forward end of the shaft 47 has a bevelled gear 52 mounted thereon which interengages a bevelled gear 53, the latter being mounted upon a hollow shaft 54. The hollow shaft 54 is journalled in bearings 55 and 56 disposed at spaced positions and supported by brackets 57, the latter being mounted upon the front wall of the hopper housing 50. A gear 58 mounted upon the hollow shaft 54 between the bearings 55 and 56 and disposed at a suitably spaced position therebetween by the aid of washers 59 and 60, interengages a gear 61 of the unit 27, to impart a suitable rotary movement to this unit to assemble the small nut 17 on the article. A pulley 63 rotatable with the gear 61 drives a belt 64 to drive the unit 25 through the aid of a pulley 65 mounted upon the latter. This constitutes the driving means for the units 25 and 27.

*Forming unit 28*

The driving means for the unit 28 is taken from the upper end of the motor shaft 32 (Fig. 1), this end of the motor shaft supporting and driving a pulley 68 which, through a belt 69, drives a pulley 70, the latter being keyed to a spindle 71 as illustrated in Fig. 16. The pulley 70 is supported between spaced bearing members 72 of a bearing bracket 73, the latter being a companion portion of the bearing bracket 48 and supported by the hopper housing 50. The spindle 71 has an elongate keyway 75 to permit axial movement of the spindle relative to the pulley 70 and functions with the key in the pulley to assure rotation of the spindle with the pulley. The spindle 71 extends through the hollow shaft 54 and has a spinning head 76 mounted upon the lower end thereof, a concave recess 77 being formed in the lower end of the head to effect spinning of the upper end of the article, that is, the outer end of the stud 12, to hold the parts, namely the washers 14 and 16 and the nuts 15 and 17, thereon.

A ball bearing collar 78 is mounted upon the spindle 71, as shown in Fig. 16, and to this collar a yoke end 79 of a cam lever 80 is pivotally connected as at 81. The lever 80 is pivotally supported at 82 and normally urged counterclockwise to normally hold the spindle 71 upwardly in its inoperative position by a tension spring 83, the latter having one end connected to the lever 80, the other end being supported by a pin 84 carried by the hopper housing 50. The lever 80 has a lever portion 86 pivoted thereto at 87 and provided with a cam roller 88 at its free end. A spring 89, connecting the lever portion 86 with the lever 80, renders the lever and its lever portion sufficiently rigid to actuate the unit 28 to perform the spinning operation but supplies sufficient flexibility to avoid damage to the article or to the unit. A cam 90, mounted upon the cam shaft 38, is rotated to effect actuation of the unit 28 at predetermined time intervals with the movement of the articles.

*Tray moving mechanism*

Attention is now directed to the mechanism for intermittently moving the trays 20 relative to the units 25 to 28 inclusive. The trays 20, as previously described, contain rows of recesses 21, 22 and 23. It will be noted that the rows of recesses differ in size for different sizes of articles, these recesses, although being circular in general contour, having flat surfaces 93 to engage the flat sides of the heads of the articles to hold the articles against rotation. The trays are connected to predetermined links of a chain 94, the latter being mounted upon sprockets 95 and 96 disposed in an elongate aperture 97 in the table 30.

The sprocket 96 is rotatably mounted upon a shaft 98 which is journalled in a bearing bracket 99 and provided with a friction brake in the form of a spring 100, to apply a predetermined braking force on the sprocket to eliminate movement of the trays beyond their stations during their intermittent travel, to assure location of the articles in alignment with the units. The bearing bracket 99 is apertured, to receive spaced supporting rods 101, and split adjacent these apertures so as to be clamped at desired adjusted positions on the rods by the aid of screws 102. The supporting rods 101 have their rearmost ends supported by a bracket 103, the latter being mounted upon a vertical portion 104 of the table 30.

The sprocket 95 is fixedly mounted upon a shaft 105, the latter being journalled in a bearing bracket 106 of similar structure to the bearing bracket 99, it being provided with spaced apertures to receive supporting rods 107 and split adjacent the apertures for adjustable mounting on the rods through the aid of screws 108. The rods 107 are supported by a bracket 109 which is mounted upon the vertical portion 104 of the table 30. The lower end of the shaft 105 supports a ratchet 110 and an oscillating member 111, the ratchet being fixed to the shaft while the member is free to rotate thereon but held against displacement by a collar 112. A pawl 114 (Fig. 14) is pivotally mounted at 115 upon the oscillating member 111 and normally urged into engagement with teeth of the ratchet by the aid of a spring 116. An adjustable rod 117 is connected to the oscillating member 111, as illustrated in Fig. 14, this rod being operatively connected to a pull rod 118 through a swivel connection 119. As illustrated in Fig. 15, the pull rod 118 is adjustably connected to a cam lever 120, the latter being pivotally supported at 121 and normally urged counterclockwise by a spring 122. The force of the spring 122 is sufficient to move the cam lever 120 about its pivot, to force the pull rod 118, the connection 119, the rod 117 and the oscillating member 111 in a direction to cause clockwise movement of the oscillating member to move the pawl 114 the distance of one or more teeth of the ratchet 110. A cam 123, of the contour illustrated in Fig. 15, is mounted upon the cam shaft 38 and adapted to engage a cam roller 124 of the cam lever 120 and bring about a reverse movement of the mechanism just described to rotate the ratchet 110 the distance of one or more teeth. With this structure intermittent movement is imparted to the sprocket 95, imparting similar movement to the chain 94 to move the trays with the articles intermittently from one station to the other, such movements being equal to the distance between the recesses in each row thereof in the trays. In the present instance the articles are disposed in the rows of recesses 21, and the sprockets 95 and 96 with their supporting brackets 106 and 99 are located forwardly so that the recesses 21 with the articles therein will pass in alignment with the units 25 to 28 inclusive. If it is desirable to use the other recesses or other types of articles, the bearing brackets 106 and 99 may be adjusted on their respective supporting rods. 107 and 101, to bring the selected recesses of the trays into alignment with the units.

Hopper housing

In viewing Fig. 2, it will be noted that there are three hopper compartments 125, 126 and 127 in the hopper housing for parts 15, 16 and 17 to be fed to the operating units 25, 26 and 27 respectively. These compartments are provided with pickup blades 128, 129 and 130 respectively, movable in closely fitting slots in the bottom and rear walls of the hopper compartments. The pickup blades are mounted upon a common rocking shaft 131 which is journalled in suitable bearings of brackets 132 and 133, these brackets being mounted at the ends of the hopper housing 50.

Attention is now directed to Figs. 17 and 18, which illustrate the bracket 133 as having a guideway 135 for roller supporting blocks 136 and 137, these blocks supporting rollers 138 and 139 respectively. Aligned pins 140 of the blocks receive the ends of a compression spring 141, normally urging the blocks away from each other and providing a resilient connection between the blocks and their respective rollers. Laterally projecting integral flanges 142 of the blocks also support aligned pins 143 for another spring 144 of like structure to the spring 141, these springs uniting in forming a resilient connection between the blocks and their rollers. An arm 145, fixed to the rocking shaft 131, is normally urged into engagement with the roller 139 by a tension spring 146. A cam 147 of the contour illustrated in Fig. 17, is mounted upon the cam shaft 38 and positioned in engagement with the cam roller 138 to effect actuation of the resilient element, namely the springs 141 and 144, their blocks and rollers, to cause oscillation of the arm 145. One surface of the cam 147 is provided with a plurality of high points 148, to create an agitating movement which is transmitted back to the pickup blades through their connecting mechanism.

Assembling unit 25

With the movement of the pickup blades in mind, attention is now directed to Fig. 3, which illustrates a sectional view through the hopper compartment 125 associated with the unit 25. The compartment 125 is filled to the dot-dash line 149 with the parts 15, which are purposely not shown so that the structure of the blade 128 may be illustrated. The pickup blade 128 is, as shown in Fig. 2, disposed adjacent the inner wall of the compartment and during this movement it is lowered so that an upper edge 150 thereof is adjacent an angularly positioned bottom wall 151 of the hopper compartment. The upper edge 150 of the pickup blade 128 is grooved throughout the major portion of its length, as at 152 (Figs. 3 and 7), this groove being of sufficient width to freely receive the nuts 15, which are loosely disposed in the hopper compartment, edgewise but will not receive the nuts in any other position. An outer surface 153 of the blade is also tapered downwardly to eliminate the possibility of any of the nuts resting upon the upper edge 150 of the blade. During the oscillating movements of the blade 128, it is undisturbed by the parts, namely the nuts 15 in the hopper compartment, but as it passes downwardly through the quantity of parts in the compartment the parts will tend to fill the space left by the blade some of which will lie flush with the inner wall of the compartment. These parts will be picked up in the groove 152 and through the jarring motion imparted to the blade, other parts tending to ride upwardly therewith, will be jarred free thereof. Furthermore, the groove 152 in the blade is of sufficient length to receive a plurality of parts only one of which is necessary for each cycle of operation. This assures a definite supply of parts for the unit 25. When the blade 128 reaches its uppermost position, the part or nut in the first position on the blade will be brought into registration with an outlet 155 of the hopper compartment, the lower edge of which is tapered to allow the nut to slide into a chute 156. To assure against jamming of the parts, the forward end of the blade 128 is arcuate in shape and positioned to ride relative to a fixed member 157, in the hopper compartment, the latter having an adjacent surface of similar contour. The radii of the meeting arcuate surfaces of the blade 128 and member 157 are from the center of the shaft 131. A projection 158, which continues the arcuate shape of the blade 128, serves to clear the path of the blade at the forward end thereof. As a further protection against jamming of parts at the outlet 155, a safety element 159 (Fig. 3) serves to close a continuation of the outlet 155 through the force of a spring 160 but permits outward movement of an additional part or nut should such continue to ride upwardly upon the nuts in the groove 152.

The chute 156 is mounted in the position shown, providing a guideway for the free movement of the parts downwardly in an aligned path, one side of the chute being partially opened so that the operator may observe the quantity of parts therein. Adjacent the lower end of the chute 156, a feeding element 162 is pivotally mounted, at 163, and is normally urged in the position shown by a spring 164. The element 162 is of the contour shown, having an arcuate projection 165 adapted to extend through slots in the chute to close the lower end of the chute to hold the parts therein against downward movement. A companion retaining element 166, pivoted at 167 at the opposite side of the chute, is normally urged counterclockwise by a spring 168 so that the lower end 169 thereof will engage the end of the projection 165 of the element 162. A finger 170, integral with the element 166, is positioned to project between the lowermost part in the chute and the one following it upon counterclockwise movement of both the elements 162 and 166 when such movement is imparted to the element 162.

The lower end structure of the chute 156 is shown in Fig. 19. The element 166 is broken away to illustrate aligned slots 172 in opposite walls of the chute to respectively receive the inwardly projecting portions of the element 162 and the retaining element 166. The lower end of the chute is supported by a bracket 173 having an arcuately curved track 174 for the parts, namely the nuts 15, as they drop singly from the chute and to direct the parts into a horizontal plane, a forward end 175 stopping movement of the parts singly to cause them to drop through an aperture 176 in the bracket. The bracket 173 is mounted upon a base 177, of a contour illustrated in Figs. 3 and 19, grooved in its upper surface, as at 178, to movably receive a slide or feeding element indicated generally at 179.

In the present embodiment the feeding element is composed of two portions 180 and 181, the portion 180 recessed at its forward end, as at 182, to receive the parts 15 singly from the chute when aligned with the aperture 176. The portions 180 and 181 have uprights 183 and 184 respectively secured thereto, the upright 183 having a rod 186 secured thereto and extending laterally through an aperture in the upright 184, the free end of the rod being provided with a head 187. A compression spring 188, disposed concentric with the rod 186, serves to provide a cushioning connection between the portions 180 and 181, the rod also assisting in connecting the portions. A laterally projecting pin 190, carried by the upright 183, is positioned to engage a projection or finger 191 of the element 162, to cause counterclockwise movement of the element when the slide 179 is moved rearwardly, that is to the right. Rearward movement is imparted to the slide 179 by suitable means, such as a compression spring 193, disposed in the recesses in the base 177, one end of the spring abutting a solid wall 194, the other end engaging a projection 195 of the portion 181 of the slide. The spring 193, being connected directly with the portion 181 of the slide, imparts movement to this portion, and due to the connection of the portion 181 with the portion 180 through the rod 186, the force of the spring 193 will also impart rearward movement of the portion 180. The distance the portion 180 of the slide 179 is moved rearwardly is limited by a stop pin 196 engaging a rear wall of a groove 197. This same stop pin controls the forward movement of the portion 180 by its engagement with the forward wall of the groove 197.

Forward movement is imparted to the slide 179 through the rotation of a cam 198 in engagement with a cam roller 199 rotatably carried by the portion 181. It will, therefore, be observed that during each cycle of rotation of the cam shaft 38, upon which the cam 198 is mounted, the slide 179 will be moved from its normal position, where the recess 182 is disposed beneath the aperture 176 adjacent the chute 156, to receive a part, namely a nut 15, from the chute, after which the slide is moved forwardly into alignment with the unit 25 so that the unit may be lowered to receive the part, the slide remaining in this position only long enough for the unit to remove the part therefrom. During the rearward movement of the slide 179, the element 162 is moved counterclockwise about its pivot against the force of the spring 164, the force of the spring 168 causing the retaining element 166 to follow the counterclockwise movement of the element 162 until the finger 170 has moved between the two lowermost parts in the chute. The element 166 remains in this position to hold all of the parts in the chute against downward movement excepting the lowermost one, this one being freed by the element 162 after the element has been moved a sufficient distance to withdraw the projection 165. When the lowermost part is freed by the element 162, it will drop by gravity, guided by the track 174, into a horizontal position stopped by the end wall 175, after which the part will drop through the aperture 176 into the recess 182. Therefore, during the rearward movement of the slide 179 a part is fed to the recess 182, this part being moved into alignment with the unit 25 during forward movement of the slide through the actuation of the cam 198.

Referring now to the unit 25, it has been previously described how this unit is rotated through the driving of the belt 64 to drive the pulley 65. The pulley 65 carries a key (not shown), which rides in a keyway 200 in a spindle 201. The spindle 201 is rotatably supported by spaced bearings 202 carried by the brackets 57 and disposed upon each side of the pulley 65, serving to hold the pulley against axial displacement.

Attention is now directed to Fig. 6, as well as to Fig. 3, which illustrates a bearing collar 205 rotatably mounted on the spindle 201 and having the forward end of a cam lever 206 pivotally secured thereto as at 207. The cam lever is pivoted at 208, upon a bracket supported by the hopper housing, the rearward end of the lever being pivotally connected, at 209, to a lever portion 210 supporting a cam roller 211 at its lower end. A spring 212, connecting the lever portion 210 with the bracket supporting the lever 206, functions to cause the levers to operate as if they were a solid unit yet adding flexibility thereto to prevent jamming and possibly breakage. This spring functions to hold the roller 211 into engagement with a cam 214, this cam being mounted on the cam shaft 38 and having a small high portion 215 and a large high portion 216 for purposes hereinafter described. Another spring 217 connected to the cam lever 206 normally urges the lever clockwise and functions to move the unit 25 upwardly.

Referring again to the unit 25, particularly Fig. 6 it will be noted that the lower end of the spindle 201 has a hollow portion 218 to receive a compression spring 219. A sleeve 220 is disposed upon the lower end of the spindle 201 and secured thereto by a pin 221 or other suitable means. The lower end of the sleeve 220 is threaded to receive a nut 222, this nut being centrally apertured to receive a tubular portion 223 of a chuck 224, the latter being recessed, at 225, with a cross sectional contour comparable to the contour of the parts or nuts 15. The inner end of the portion 223 has an integral annular member 226 positioned to engage a frictional washer 227, this washer also engaging the end of the spindle 201 and functioning as a friction clutch between the spindle and the member 226. A spring 228, disposed in the sleeve 220 concentric with the portion 223, serves to apply a predetermined force on the member 226 against the friction washer 227. A retaining element 230, disposed in the tubular portion 223, is limited in its downward movement by a shoulder 231, it being forced downwardly by the spring 219 but allowed to move upwardly against the force of the spring during the assembling of the part on the article. The lower end of the element 230 is hollow and provided with a plurality of longitudinal slots 232, only one of which is shown, to provide resilient fingers 233 to enter the parts singly as they are positioned in the recess 182 thereneath and to hold the parts in the chuck until they are assembled on the articles.

The contour of the small high portion 215 of the cam 214 is such that it will cause actuation of the cam levers associated therewith to move the unit 25 downwardly a distance sufficient to cause the chuck 224, with its retaining element 230, to receive the nut from the recess 182, after which the unit 25 is allowed to be moved upwardly by the spring 217 a sufficient distance to allow rearward movement of the slide 179. After the slide 179 has moved rearwardly the unit 25, through the high portion 216 of the cam, is moved downwardly over the stud portion 12 of the article 10 to a point where the resilient fingers 233 rest upon the upward end of the threaded portion 11, after which downward movement of the unit 25 is continued to drive the part 15 onto the threaded portion 11. The unit 25 is continuously rotated in a direction to cause the part to be driven onto the threaded portion of the article, this operation continuing until the cam 214 releases its levers 206 and 210 to allow the spring 217 to function to return the unit 25 to its normal or upward position. During the operation of the unit in moving the part to its threaded portion 11, the element 230 functions to accurately and positively guide the part over the stud 12, the stud at this point entering the hollow lower end of the element. The element 230 also serves as a guide for the part while the latter is being driven onto the threaded portion 11.

*Assembling unit 26*

Attention is now directed to the washer feeding unit illustrated in Figs. 4, 9, 10, 11 and 12. Associated with this unit is the hopper compartment 126 and the pickup blade 129. The hopper compartment 126 is filled to approximately the dot-dash line 235 with the parts or washers 16 which are purposely not shown so that the structure of the blade 129 may be illustrated. The pickup blade 129 is mounted on the shaft 131 and disposed adjacent the inner wall of the compartment 126. The back and lower walls of the compartment are provided with an opening for the movement of the blade 129 therethrough, this opening being closed by the blade at all times. The upper surface of the blade 129 is grooved, at 236, to receive parts or washers 16 edgewise, the blade also having downwardly tapering surfaces 237 to prevent washers from remaining on the blade other than in the groove. The forward end of the blade is arcuate in shape, the radii of which are from the center of the shaft 131, this arcuate contour continuing in a projection 238 and cooperating with a member 239 with a similar arcuate surface 240 to allow movement of the blade in the hopper compartment without interference with the parts therein. Adjacent the upper end of the member 239, a tapered surface 241 is provided, connecting the groove 236 when disposed thereadjacent with an outlet 242, the latter providing communication between the hopper compartment 126 and a chute 243. A safety element 244 (Fig. 4) pivotally supported at 245 and normally held inwardly by a spring 246, functions to cause the parts to pass singly into the chute from the blade and to eliminate jamming of the parts at the outlet 242.

The chute 243 is substantially identical in contour and structure with the chute 156, it being provided at its lower end with a bracket 250 substantially identical in structure with the bracket 173 of Fig. 19, any variations being in the size of the aperture therein. The bracket 250 functions to guide the parts singly into horizontal positions and cause them to fall into a recess 251 of a portion 252 of a slide indicated generally at 253. The lower end of the chute 243 is also provided with an element 254 identical in structure with the element 162 of Fig. 3, and pivotally supported at 255 upon the chute. A spring 256 normally urges the element 254 clockwise to hold an arcuate portion 257 thereof in the slot in the lower end of the chute, to support the parts against downward movement. A retaining element 259 is identical in structure to the element 166 of Fig. 3 excepting the location of a retaining finger 260 thereof, this finger being positioned to release two parts and to retain the other parts in the chute. The element 259 is pivoted, at 261, and has its lower end 262 positioned to engage the portion 257 of the element 254 and be controlled thereby. A spring 263 normally urges the element 259 counterclockwise, causing it to follow the element 254 when counterclockwise movement is imparted to the latter.

The slide 253 is identical in structure to the slide 179 excepting the forward end of the portion 252, the slide 253 being formed of two portions 252 and 265. The portions of the slide 253 have their uprights 266 and 267 operatively connected through a rod 268 supported by the upright 266 and further joined by a spring 269 disposed on the rod between the uprights. A head 270 of the rod functions in the rearward movement of the slide. The slide is moved rearwardly through a spring 271, having the same function as the spring 193 of Fig. 3, this movement being limited by a stop member 272 carried by the portion 252 in a groove 272 of a base 274, supporting the slide, and being limited in its movement by the end walls of the groove. A cam 275, mounted upon the cam shaft 38, cooperates with a roller 276 of the portion 265, to effect forward movement of the slide, particularly the portion 265 thereof, the spring 269 functioning to cause forward movement of the portion 252. The forward end of the portion 252 of the slide has radially disposed notches 278 therein extending into the recess 251 for a purpose hereinafter described. During movement of the slide 253, a pin 280, carried by the upright 266, engages a projection 281 of the element 254 for movement of the element counterclockwise during rearward movement of the slide.

Attention is now directed to the unit 26, which includes a spindle 283 supported for axial movement in spaced bearings 284, the latter being supported by the brackets 57 mounted upon the hopper housing 50. The spindle 283 is apertured, at 286, to receive the forward end of a cam lever 287 serving to hold the spindle against rotation and impart axial movement thereto. The cam lever 287 is pivotally supported at 288 by a bracket 289, the latter being mounted upon the hopper housing 50. The rearward end of the lever 287 is pivotally connected, at 290, to a lever portion 291, the latter supporting a cam roller 292 at its lower end. A spring 293, connecting the lever portion 291 to the bracket 289, functions to cause the levers to act in unison yet adds resiliency thereto. A cam 295, mounted upon the cam shaft 38, has a small high portion 296 and a large high portion 297 for purposes hereinafter described.

Referring again to the unit 26, attention is directed to the lower end of the spindle (Figs. 4, 9 and 10), this end being threaded as at 300. A hollow element 301, internally threaded at its upper end, is mounted upon the threaded portion 300 of the spindle and locked thereon by a nut 302 which is larger in diameter than the element, for a purpose hereinafter described. The lower end of the portion 300 has a plurality of radially positioned grooves 303 and integral projections 304 at the sides of the grooves. The grooves 303 are provided to receive fingers 305, which are disposed between their respective pairs of integral projections 304, to which they are pivotally secured as at 306. The fingers are identical in structure and of the contour illustrated in Figs. 9 and 10, they being provided with rounded upper ends 307 and notched lower ends, the notches being indicated at 308, with rounded surfaces therebeneath indicated at 309. A spring 310 is provided for each finger, normally urging their respective fingers about their pivots to move the notched ends toward the center line of the element 301. A centering element 311, having a rounded lower end, is movably disposed in the hollow element 301, limited in its downward movement by an integral shoulder 312, where it is held normally by a spring 314, the spring 314 being of the compressible type to allow relative movement of the centering element 311 and the element 301.

A cylindrical releasing member 315 is disposed concentric with the element 301, the lower end of the member being formed to provide a conical surface 316. The releasing member is free to move on the element 301 but is guided against rotation by a pin 317 riding in a groove 318 of the element. A longitudinal groove 319 is formed in the element, extending the full length thereof and adapted to receive a retaining spring 320 formed to provide a sufficient frictional contact with the walls of the groove to support the retaining member against movement by its own weight. The spring 320 is supported on a suitable member 322, by screws 323, and is adjustable relative thereto.

During each cycle of rotation of the cam shaft 38, the pickup blade 129 moves through a complete cycle, that is it moves to its outermost limit, for the purpose of picking up washers in the groove 236, and then moves upwardly to its uppermost position, where washers may pass from the groove through the outlet 242 and into the chute 243. During this cycle of operation of the cam shaft 38, the slide 253, under the control of the cam 275 and the spring 271, is caused to move rearwardly to move the recess 251 into registration with the outlet aperture of the bracket 250, to receive two parts or washers 16 from the chute when released by the element 254. The element 254 is caused to release two parts from the chute, rendering the retaining element 259 effective to retain all the other parts in the chute, during the rearward movement of the slide 253, through the combination of the pin 280 with the projection 281. The feeding of the parts to the slide occurs during one portion of cycle of rotation of the cam shaft. During another portion of this same cycle, the slide is moved forwardly to position the recess 251 beneath the unit 26, at which time the high portion 296 of the cam 295 functions to actuate the cam levers 287 and 291 to move the unit 26 downwardly a distance sufficient to cause the fingers to grip the two parts in the recess 251. The slide 253 is held in the forward position while the fingers 305 are moved downwardly, their surfaces 309 riding on the outer peripheries of the parts through the notches 278 in the slide portion 252 and the notches 308 registering with the parts. During the movement of the fingers to pick up the parts 16 from the recess 251 of the slide, the centering element 311 passes through the parts. After this operation has been completed the unit 26 is again raised to its normal position, removing the parts from the recess and allowing the slide 253 to again move rearwardly out of the path of the unit.

The unit 26 is then moved downwardly to move the parts, held by the fingers, onto the stud 12 of the article 10 positioned therebeneath, the centering element 311 maintaining its position within the parts until it comes to rest upon the end of the article where it remains against movement while the unit in general and the fingers continue their movement to place the parts on the article. During the downward movement of the unit 26 the nut 302 engages the releasing member 315 and pushes the member free of the frictional holding force of the spring 320, at which time the member will drop by gravity onto the fingers 305, the conical surface 316 of the releasing member causing movement of the fingers about their pivots and against the force of their spring 310 to release the parts 16. The fingers will thus be held in the released positions during the subsequent upward movement of the unit 26 as the roller 292 leaves the high portion 297 of the cam 295. During this upward movement the releasing member 315 is again brought into engagement with the holding spring 320, the latter entering the groove 319, where the releasing member is held through another portion in the cycle of operation of the unit including picking up of the parts from the slide 253 and until they are disposed on the next article.

*Assembling unit 27*

Attention is now directed to the unit 27, which is identical in structure in most every detail to the unit 25 shown in Fig. 3, including the feeding means and its operating mechanism, the main difference lying in the size of certain parts to accommodate the smaller nut 17. The unit 27 includes a spindle 325 movable axially relative to the pulley 63 and the gear 61 in its bearings 326 and provided with a chuck 327 at its lower end with the same structure as shown in Fig. 6, illustrating the unit 25. The hopper compartment 127 includes the pickup blade 130 of the contour shown in Figs. 5 and 8, an assisting member 330 and a safety element 331. The safety element 331 is mounted pivotally at 332 and is normally urged counterclockwise by a spring 333 to maintain ejection of the parts 17 singly through an outlet 334 and into a chute 335. The hopper compartment 127 is filled to approximately the dot-dash line 336, the parts purposely not having been shown so that the detailed structure of the blade 130 may be illustrated. With these differences in mind and with a full understanding of the unit 25, it is not believed necessary to complete the description of the unit 27 and the feeding mechanism associated therewith, as it would be substantially a repetition of the description of the structure shown in Fig. 3.

*Operation of the apparatus*

When the apparatus is in operation, the motor 33 causes rotation of the units 25, 27 and 28 and rotation of the rocking shaft 131 through definite cycles with the cam shaft 38, the latter functioning with its cams to bring about operations of the units 25, 26, 27 and 28 during the rest period of the feeding mechanism which is also under the control of the cam shaft.

It is believed that a clear understanding of the operation of the apparatus may be had by following one article 10 from the time it is placed in a recess 21 of one of the trays 20 until it has passed by the units with its assembled parts. For example, let the article 10, with its washer 14, disposed in the first recess 21 of the tray 20 beginning its arcuate movement about the sprocket 96, be the one selected to follow. This article must of necessity await the completion of several cycles of operation of the apparatus before it reaches the assembling units, it having been placed in the tray by an operator when the tray was opposite the units.

The article first reaches the unit 25. However, prior to the time the article reaches this unit, the mechanism illustrated in Fig. 3 associated with the unit has been set in operation; that is, the pickup blade 128 has fed one or more parts or nuts 15 to the chute 156, the lowermost part 15 in the chute has been delivered to the recess 182 through the actuation of the slide 179, the ejecting element 162 and the retaining element 166, and the part in the recess has been moved forwardly with the slide, aligning it with the unit 25. Furthermore, prior to the article reaching the said position beneath the unit 25, the unit has been lowered to receive the part and subsequently raised to its upper position, following which movements of the unit the slide 179 is moved rearwardly so that when the article comes to rest beneath the unit the latter is being lowered to assemble the part or nut thereon. That is, the part is held by the unit and the unit is ready to assemble the part on the article the moment they are aligned, as the assembling operation must take place during the rest period of the tray 20 and the unit must be free of the article prior to the next movement thereof.

The article which has been supplied with the part 15 then moves through a predetermined number of feeding movements until it is brought into alignment with the unit 26. Parts, namely the washers 16, have been supplied to the chute 243, the slide 253 has been moved rearwardly, effecting ejection of two of the washers successively from the chute to stacked formation in the recess 251 through the actuation of the elements 254 and 259, after which the slide has been moved forwardly and the washers removed therefrom by the fingers 305 of the unit 26. Furthermore, prior to the movement of the article into alignment with the unit 26, the slide has returned to its predetermined position out of the path of the unit and the unit has started its downward movement. As soon as the article is moved into alignment with the unit 26, the unit is moved downwardly to move the washers carried thereby onto the article and move upwardly free of the article before the article is again advanced.

The article has thus far received the part or nut 15 and the two parts or washers 16. The article then continues in its intermittent movements until it is brought into alignment with the unit 27. Here again a series of operations has been completed to feed the part or nut 17 to the chuck 327 of the unit 27 so that the moment the article comes to rest beneath this unit the nut may be brought into registration with the stud 12 of the article, and through the rotation of the unit the part may be driven thereon. This completes the assembling of the parts on the article. However, the article is continued in its intermittent movements until it is brought into alignment with the unit 28, at which time the spindle 71 (Fig. 16) is lowered through the operation of the cam 90 and the levers 80 and 86, to move the head 76, which is continuously rotating, into engagement with the upper end of the article, to transform the end of the article, through the spinning operation, to effect retaining of the parts thereon, against displacement. The operation upon the suggested article has then been completed. The article remains in its tray, moving intermittently therewith until it is brought to a position where the operator removes it from the recess in the tray and replaces it with another article.

The cycle of operation has been completed regarding one article. Attention is directed to the fact that the units 25, 26, 27 and 28 are operated substantially simultaneously, to perform their work on a plurality of articles at the same time, these articles being at different positions in the trays, but due to the distance in which the trays are moved intermittently, each article will in a definite sequence be moved into successive alignment with the respective units to receive the parts in definite order and finally be formed to effect retaining of the parts thereon.

The embodiment of the invention herein disclosed is merely illustrative and may be widely modified and departed from in many ways without departing from the spirit and scope of the invention as pointed out in and limited solely by the appended claims.

What is claimed is:

1. In an assembling apparatus, a support for an article having an externally threaded portion, means to move the support intermittently to advance the article, means operated in synchronism with the said moving means to place a washer on the article, and means operated in synchronism with the said moving means to subsequently drive a nut on the threaded portion of the article.

2. In an assembling apparatus, a support for an article having an externally threaded portion, means to move the support intermittently to advance the article, means operated in synchronism with the said moving means to place a washer on the article, means operated in synchronism with the said moving means to subsequently drive a nut on the threaded portion of the article, and means to form the threaded portion of the article to maintain nut and washer on the said threaded portion against displacement.

3. In an assembling apparatus, a support for an article having threaded portions, means to move the support intermittently to advance the article, separate means operated at different intervals in synchronism with the said moving means to drive different threaded parts on the said threaded portions of the article, and means to form the article to maintain the threaded parts on the threaded portions thereof against displacement.

4. In an assembling apparatus, a support for an article having threaded portions, means to move the support intermittently to advance the article, separate means operated at different intervals in synchronism with the said moving means to drive different threaded parts on the said threaded portions of the article, and means operated in synchronism with the said moving means to assemble a washer on the article.

5. In an assembling apparatus, a support for an article having threaded portions, means to move the support intermittently to advance the article, separate means operated at different intervals in synchronism with the said moving means to drive different threaded parts on the said threaded portions of the article, and means operated in synchronism with the said moving means to assemble a washer on the article between the threaded parts.

6. In an assembling apparatus, a support for an article having threaded portions of different sizes, means to move the support intermittently to advance the article, and separate means to drive threaded parts of different sizes on the said threaded portions of the article.

7. In an assembling apparatus, a support having a plurality of spaced receiving portions for articles of different types, units operable to assemble parts on the articles, means to intermittently advance the support in a path relative to the units, and means to vary the path of advancement of the support to effect selective positioning of the articles of different types at predetermined intervals in alignment with the units.

8. In an assembling apparatus, trays each having a plurality of spaced receiving portions for different types of articles, units operable to assemble parts on the articles, means to intermittently advance the trays in a path relative to the units, and means to vary the path of advancement of the trays to effect selective positioning of the articles of different types at predetermined intervals in alignment with the units.

9. In an assembling apparatus, a reciprocable unit including part gripping portions, a feeding element having a part supporting portion reciprocable between a loading position out of alignment with the unit and a feeding position in alignment with the unit, means to position an article in alignment with the unit, means to reciprocate the element, and means to reciprocate the unit in synchronism with the element to cause the gripping portions to remove the part from the element and assemble the part on the article.

10. In an assembling apparatus, a reciprocable unit including part gripping portions, a feeding element having a part supporting portion reciprocable between a loading position out of alignment with the unit and a feeding position in alignment with the unit, means to position an article in alignment with the unit, means to reciprocate the element, and means to reciprocate the unit between varied limits to cause the gripping portions to remove the part from the element and assemble the part on the article.

11. In an assembling apparatus, a reciprocable unit including part gripping portions, a feeding element having a part supporting portion reciprocable between a loading position out of alignment with the unit and a feeding position in alignment with the unit, means to position an article in alignment with the unit, means to reciprocate the element, means actuable by the element to feed a part to the element, and means to reciprocate the unit in synchronism with the element to cause the gripping portions to remove the part from the element and assemble the part on the article.

12. In an assembling apparatus, a reciprocable unit including part gripping portions, a feeding element having a part supporting portion reciprocable between a loading position out of alignment with the unit and a feeding position in alignment with the unit, a chute for a plurality of parts disposed adjacent the said loading position, means to position an article in alignment with the unit, means to reciprocate the element, means actuable by the element to cause ejection of a part from the chute, and means to reciprocate the unit in synchronism with the element to cause the gripping portions to remove the part from the element and assemble the part on the article.

13. In an assembling apparatus, a reciprocable unit including part gripping portions, a feeding element having a part supporting portion reciprocable between a loading position out of alignment with the unit and a feeding position in alignment with the unit, a chute for a plurality of parts disposed adjacent the said loading position, means to position an article in alignment with the unit, means to reciprocate the element, means actuable by the element to cause ejection of a plurality of parts from the chute for the supporting portion of the element, and means to reciprocate the unit in synchronism with the element to cause the gripping portions to remove the ejected parts simultaneously from the element and assemble them on the article.

14. In an assembling apparatus, a reciprocable unit including part gripping portions, a feeding element having a part supporting portion reciprocable between a loading position out of alignment with the unit and a feeding position in alignment with the unit, a chute for a plurality of parts disposed adjacent the said loading position, means to position an article in alignment with the unit, means to reciprocate the element, means actuable by the element to cause ejection of a plurality of parts successively from the chute, means to cause the ejected parts to come to rest in stacked formation on the supporting portion of the element, and means to reciprocate the unit in synchronism with the element to cause the gripping portions to remove the ejected parts simultaneously from the element and assemble them on the article.

15. In an assembling apparatus, a reciprocable unit having gripping fingers adapted to grip a part therebetween, a feeding element having a part supporting portion reciprocable between a loading position out of alignment with the unit and a feeding position in alignment with the unit, means to feed a part to the said supporting portion at the loading position, means to position an article in alignment with the unit, means to reciprocate the element, means to reciprocate the unit in synchronism with the element to cause the gripping fingers to grip the part, remove the part from the said supporting portion and lower the part onto the article, and means to release the fingers from the part.

16. In an assembling apparatus, a rotating unit mounted for reciprocation and including a hollow chuck, means to position an article, having portions of different diameters, in alignment with the unit, means to feed a part to the chuck, means to reciprocate the unit to move the chuck with the part to the article, and means in the chuck to guide the part over one portion of the article and onto another portion thereof.

17. In an assembling apparatus, rotatable units, means to position an article, having threaded portions of varied outer diameters, in successive alignments with the units, means to feed threaded parts having varied inner diameters to the units, and means to move the units in predetermined order relative to the article to render the units effective to successively drive their parts on the respective portions of the article.

18. In an assembling apparatus, rotatable units, means to position an article, having threaded portions of varied outer diameters, in successive alignments with the units, means to feed threaded parts having varied inner diameters to the units, means to move the units in predetermined order relative to the article to render the units effective to successively drive their parts on the respective portions of the article, and a unit operable to assemble another part on the article.

19. In an assembling apparatus, rotatable units, means to position an article, having threaded portions of varied diameters, in successive alignments with the units, means to feed threaded parts to the units, means to move the units in predetermined order relative to the article to render the units effective to drive their parts on the respective portions of the article, and a unit operable to assemble another part on the article between the said threaded parts.

20. In an assembling apparatus, rotatable units, means to position an article, having threaded portions of varied diameters, in successive alignments with the units, means to feed threaded parts to the units, means to move the units in predetermined order relative to the article to render the units effective to drive their parts on the respective portions of the article, a unit operable to assemble another part on the article, and means adapted to form the article to effect retaining the parts thereon against displacement.

21. In an assembling apparatus, a plurality of assembling units actuable to assemble washers and nuts on externally threaded articles, means to intermittently advance a plurality of spaced articles relative to the units, means to feed washers and nuts to the respective units, means to actuate the units to cause assembling of their respective washers and nuts in a given order on the articles, and a spinning unit operable to spin the ends of the articles to maintain the washers and nuts thereon against displacement.

22. In an assembling apparatus, a plurality of assembling units actuable to assemble different parts on like articles, means to intermittently advance a plurality of spaced like articles relative to the units, hopper compartments for the said different parts, a pickup element for each compartment, feeding means interposed between each compartment and its respective unit to feed the parts to the units, and means to actuate the elements simultaneously to supply parts to the feeding means.

23. In an assembling apparatus, a rotatable unit mounted for reciprocation and having a part engaging and supporting chuck at one end thereof, means to position a threaded article in alignment with the unit, a feeding element movable into and out of position between the article and unit to present a part to the unit, and means to reciprocate the unit to cause the chuck to move toward the element to receive the part offered thereby, move away from the element to remove the part therefrom and then move to the article and drive the part thereon.

24. In an assembling apparatus, a unit mounted for reciprocation and having a part gripping chuck disposed at one end thereof, means to position an article in alignment with the unit, a feeding element movable into and out of position between the article and unit to present a part to the unit, and means to reciprocate the unit varied distances toward and away from the article to cause the chuck to remove the part from the element and position the part on the article.

25. In an assembling apparatus, a unit mounted for reciprocation and having a part gripping chuck disposed at one end thereof, means to position an article in alignment with the unit, a feeding element movable into and out of position between the article and unit to present a part to the unit, and means to reciprocate the unit varied distances toward and away from the article to cause the chuck to grip the part in the element, remove the part from the element and position the part on the article.

26. In an assembling apparatus, a rotatable unit mounted for reciprocation and having a part gripping chuck disposed at one end thereof, means to position a threaded article in alignment with the unit, a feeding element movable into and out of position between the article and unit to present a part to the unit, and means to reciprocate the unit varied distances toward and away from the article to cause the chuck to grip the part in the element, remove the part from the element, move the part to the article and drive the part on the article.

GEORGE A. SEELEY.